US012554042B2

(12) United States Patent
Johnson

(10) Patent No.: US 12,554,042 B2
(45) Date of Patent: Feb. 17, 2026

(54) SYSTEM AND METHOD FOR HIGH SPEED SONIC TEMPERATURE AND AIRSPEED MEASUREMENTS FOR INPUTS TO AN AIR DATA SYSTEM

(71) Applicant: Michigan Aerospace Corporation, Ypsilanti, MI (US)

(72) Inventor: William Eric Johnson, Saline, MI (US)

(73) Assignee: MICHIGAN AEROSPACE CORPORATION, Ypsilanti, MI (US)

( * ) Notice: Subject to any disclaimer, the term of this patent is extended or adjusted under 35 U.S.C. 154(b) by 294 days.

(21) Appl. No.: 18/270,129

(22) PCT Filed: Dec. 30, 2021

(86) PCT No.: PCT/US2021/065730
§ 371 (c)(1),
(2) Date: Jun. 28, 2023

(87) PCT Pub. No.: WO2022/147284
PCT Pub. Date: Jul. 7, 2022

(65) Prior Publication Data
US 2025/0231057 A1    Jul. 17, 2025

Related U.S. Application Data

(60) Provisional application No. 63/132,665, filed on Dec. 31, 2020.

(51) Int. Cl.
*G01W 1/04* (2006.01)
*B64D 43/02* (2006.01)
(Continued)

(52) U.S. Cl.
CPC .............. *G01W 1/04* (2013.01); *B64D 43/02* (2013.01); *B64U 20/80* (2023.01); *G01F 1/662* (2013.01);
(Continued)

(58) Field of Classification Search
CPC ......... G01P 5/245; G01P 5/248; B64D 43/02; B64U 20/80; G01F 1/662; G01F 1/668; G01K 11/24; G01K 13/024
See application file for complete search history.

(56) References Cited

U.S. PATENT DOCUMENTS 3,140,612 A * 7/1964 Houghton .............. G01K 11/24
73/514.05
4,174,630 A    11/1979 Nicoli
(Continued)

FOREIGN PATENT DOCUMENTS

WO        2017102277 A1    6/2017

OTHER PUBLICATIONS

PCT International Search Report mailed Mar. 29, 2022 in counterpart PCT application PCT/US2021/165730, 2 pages.
(Continued)

*Primary Examiner* — Jill E Culler
(74) *Attorney, Agent, or Firm* — Juan Carlos A. Marquez; Marquez IP Law Office, PLLC

(57) ABSTRACT

According the present invention, air velocity and speed of sound which can be used to estimate air temperature can be measured from a sonic anemometer system attached to an airborne platform. Using multiple sonic emitters and receivers coupled to an assembly attached to an airborne platform where the atmosphere is free to pass through the volume between the acoustic elements, air data products can be estimated from the acoustic transit time between acoustic emitters and receivers for use in an airborne data system. The measurement method has high update rates and is resilient against acoustic noise and icing conditions making it a robust sensing platform for use on aircraft.

9 Claims, 7 Drawing Sheets

(51) Int. Cl.
    *B64U 20/80*     (2023.01)
    *G01F 1/66*     (2022.01)
    *G01F 1/667*     (2022.01)
    *G01K 11/24*     (2006.01)
    *G01K 13/024*     (2021.01)
    *G01P 5/24*     (2006.01)
    *B64U 101/35*     (2023.01)

(52) U.S. Cl.
    CPC .............. *G01F 1/668* (2013.01); *G01K 11/24* (2013.01); *G01K 13/024* (2021.01); *G01P 5/245* (2013.01); *G01P 5/248* (2013.01); *B64U 2101/35* (2023.01)

(56) References Cited

U.S. PATENT DOCUMENTS

| | | | |
|---|---|---|---|
| 4,890,488 A * | 1/1990 | Pincent | ............ G01P 5/18 73/170.13 |
| 5,343,744 A | 9/1994 | Ammaun | |
| 5,373,736 A * | 12/1994 | Brown | ............ G01P 5/248 73/170.13 |
| 10,101,443 B1 | 10/2018 | LeGrand et al. | |
| 2012/0133544 A1 | 5/2012 | Rudd et al. | |
| 2021/0078722 A1* | 3/2021 | Shannon | ............ G01K 11/24 |

OTHER PUBLICATIONS

PCT Written Opinion mailed Mar. 29, 2022 in counterpart PCT application PCT/US2021/165730, 7 pages.

\* cited by examiner

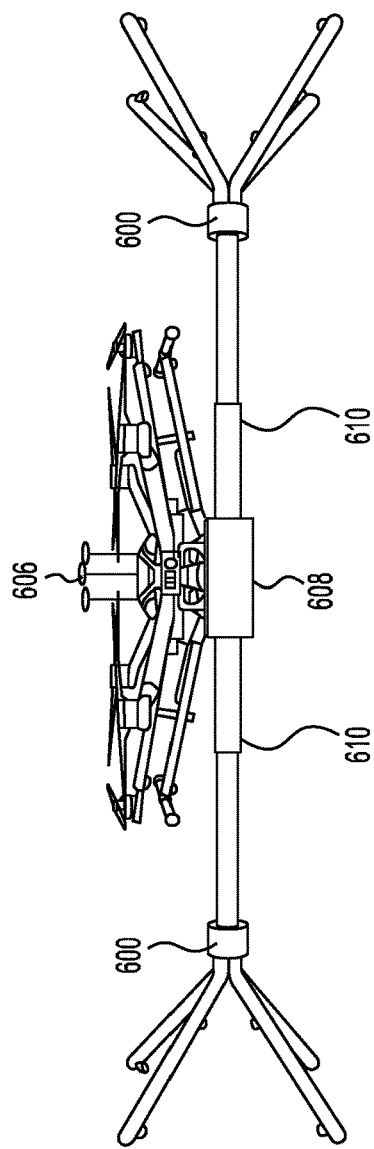
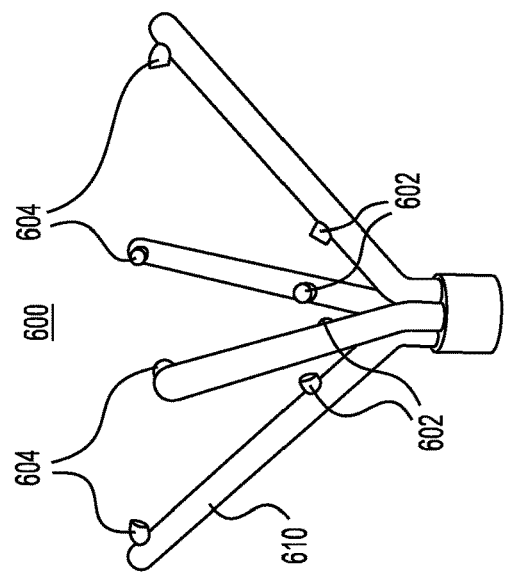
*FIG. 6B*
*FIG. 6A*

SYSTEM AND METHOD FOR HIGH SPEED SONIC TEMPERATURE AND AIRSPEED MEASUREMENTS FOR INPUTS TO AN AIR DATA SYSTEM

This application claims priority to U.S. Provisional Application No. 63/132,665 filed on Dec. 31, 2020, the entire disclosure and contents of which are incorporated herein in their entireties by reference.

BACKGROUND OF THE INVENTION

There are multiple ways to measure airspeed and air temperature of an airborne platform including pitot probes, thermal sensors, and LIDAR (Light Detection and Ranging). Sonic anemometers have a distinct advantage over other measurement methods in that they can make measurements with high signal to noise ratios and short response times because they do not suffer from the thermal mass limitations of thermistors or the shot noise limitations of active optical remote sensing methods.

Most sonic anemometers are tailored for measurement of meterological data and spend their lives near the ground on a stand or tower collecting weather data. As a result, they are not designed to be light, small, or resilient against icing conditions or acoustic noise making most units impractical for use with Unmanned Aerial Vehicles (UAVs) or manned airborne platforms. Recently some sonic anemometers have become commercially available that are small and light enough to be used on UAV platforms (FIG. 1). These small low cost sonic anemometers can be used on unmanned or manned aircraft by providing inputs to an aircraft's air data system. Performance of these commercially available units it limited however by the acoustically noisy environment produced by the UAV's making their use in an air data system limited. In principle sonic anemometers have the ability to provide data about an airborne platform's velocity, true airspeed, vertical speed, angle of attack, angle of side slip and speed of sound which can be used to estimate air temperature. Currently aircraft use pitot tube based measurements to provide aircraft speed. Issues may occur when a pitot tube is blocked by ice the air data system can produce invalid information to the flight data computer. The problem of invalid data from an air data system is important enough to start an effort to be sure that commercial aircraft have a duplicate system providing air data package information to the aircraft flight computer. Sonic anemometers could provide the independent measurement of aircraft speed needed to produce the required independent data to flag incorrect data.

Adding a pressure measurement to a sonic anemometer would allow the flight computer to calculate of static pressure, mach number, total pressure, angle of sideslip pressure differential, and angle of attack pressure differential inputs to the flight computer.

SUMMARY OF THE INVENTION

According to the present invention, air velocity and speed of sound which can be used to estimate air temperature can be measured from a sonic anemometer system attached to an airborne platform. Using multiple sonic emitters and receivers coupled to an assembly attached to an airborne platform where the atmosphere is free to pass through the volume between the acoustic elements, air data products can be estimated from the acoustic transit time between acoustic emitters and receivers for use in an airborne data system. The measurement method has high update rates and is resilient against acoustic noise and icing conditions making it a robust sensing platform for use on aircraft.

An airborne sonic anemometer system for measuring a volume space of interest in an atmosphere according to the present invention, comprises: an aerial vehicle; and an sonic anemometer system, that includes a processing circuit including a continuous wave output signal generator and a continuous wave received signal processor, at least one continuous wave piezo emitter operatively connected to receive a continuous wave output signal from the processing circuit and to emit the continuous wave output signal through the volume space, and at least one continuous wave piezo receiver spatially separated and operatively mounted to receive the continuous wave output signal emitted through the volume space from the at least one continuous wave piezo emitter.

In operation, the method of enhancing an airborne air data system in at least one embodiments incorporates the steps of: providing an airborne sonic anemometer mounted on an aerial vehicle, wherein the sonic anemometer includes at least one continuous wave piezo emitter operatively connected to at least one continuous wave output signal generator, and at least one continuous wave piezo receiver spatially separated from the at least one continuous wave piezo emitter; controlling the airborne sonic anemometer using at least one continuous wave processing circuit; receiving via the at least one continuous wave piezo receiver the continuous wave travelling through an atmospheric volume space from the at least one continuous wave piezo emitter; determining via the at least one continuous wave processing circuit wind speed from a difference in phase between the emitted and received signals due to the time-of-flight between the spatial separation of the at least one continuous wave piezo emitter and the at least one continuous wave piezo receiver; and processing the received signals so as to generate a high update rate air data measurement.

BRIEF DESCRIPTION OF THE DRAWINGS

The present invention is illustrated in the accompanying drawings, wherein:

FIG. 6(A) shows one concept for four phase locked emitters emit sound at four receivers according to the present invention;

FIG. 6(B) illustrates a concept showing a pair of high-speed sonic anemometers according to the present invention;

DETAILED DESCRIPTION OF THE INVENTION

The invention is fundamentally a sonic anemometer system optimized for making high speed measurements in acoustically noisy environments. Sonic anemometers estimate sound speed and wind velocity by making multiple measurements of acoustic time of flight along different acoustic paths. Acoustic time of flight can be measured with pulsed or phase based methods. The described invention utilizes a phase based time of flight measurement for its ability to distinguish acoustic noise from the signal of interest. Phase based measurements also allow for data acquisition and analysis to be further optimized for the high speed required for use in air data systems. A single time wind speed calculation can be made from one or more samples of the received acoustic tone and a new wind measurement can be calculated for each new sample of the acoustic tones. Calculation of the phase of each waveform can be accomplished at the high speeds necessary for use in air data systems by carefully choosing the measurement time period to be an integer number of sine periods. When this condition is satisfied phases can be estimated with Fourier's trick vs. slower Fourier transforms or least squares methods.

Theory

Figure 1:
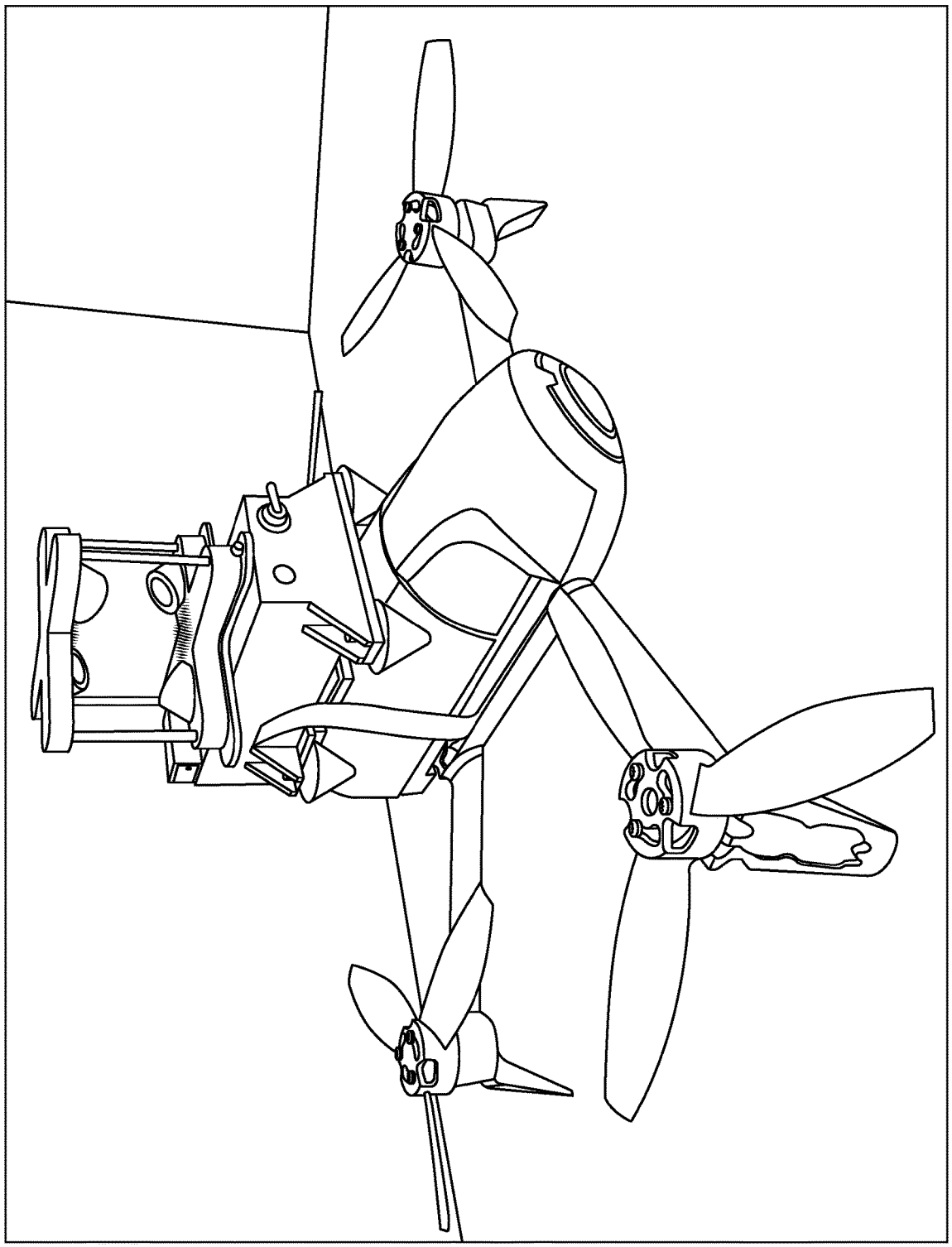
FIG. 1 shows an example of using off-the-shelf hardware for making wind velocity measurements from a UAV.
Figure 2:
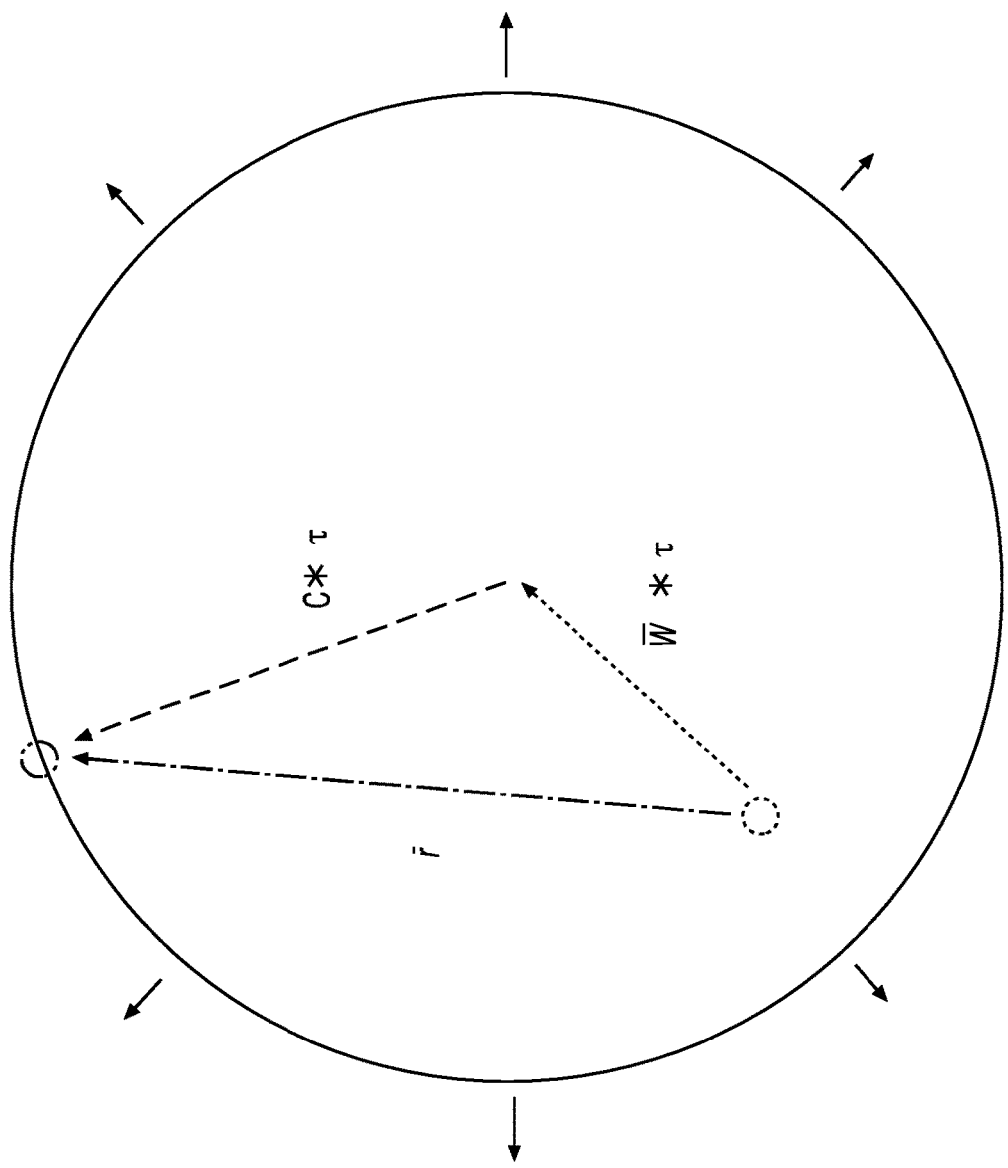
FIG. 2 shows a graphical representation of an emitting piezo produces a spherically outgoing wave moving at the speed of sound whose center of curvature is moving at the speed of the local wind field according to the present invention and whose radius is growing at the speed of sound.

At the heart of a sonic anemometer measurement, an emitting piezo produces a spherically outgoing wave moving at the speed of sound whose center of curvature is moving at the speed of the local wind field (see FIG. 2). Sound propagation in a wind field can be modeled as an outgoing spherical wave whose center is moving at the velocity of the wind and the outgoing wavefront is propagating at the speed of sound.

As shown in FIG. 2, $\bar{r}$ is the displacement vector from the emitter to the receiver, $\bar{w}$ is the wind velocity vector, $\tau$ is the time it takes for a wavefront to leave the emitter and be received at the receiver, and c is the speed of sound. These quantities are all geometrically related by the equation:

$$|\bar{r} - \bar{w} * \tau| = c * \tau \quad (1)$$

Squaring both sides of (1) and expanding gives.

$$\tau^2(c^2 - w^2) + 2 * \Delta x * w_x + 2 * \Delta y * w_y + 2 * \Delta z * w_z = r^2 \quad (2)$$

A single measurement of the time of flight from an emitter to a receiver is not enough information to quantify the sonic temperature since the time of flight is affected by the three components of the wind velocity as well as the speed of sound (this amounts to one equation with four unknowns). Thus, a minimum of four temperature measurements must be made to unambiguously solve for the sonic temperature. Adding three more emitters/receivers provides enough equations to solve for the unknowns, and a simultaneous solution of all four measurements of the time of flight for the wind velocity components and speed of sound can be achieved with a solution to the following matrix problem:

$$\begin{bmatrix} \tau_1^2 & 2*\Delta x_1 & 2*\Delta y_1 & 2*\Delta z_1 \\ \tau_2^2 & 2*\Delta x_2 & 2*\Delta y_2 & 2*\Delta z_2 \\ \tau_3^2 & 2*\Delta x_3 & 2*\Delta y_3 & 2*\Delta z_3 \\ \tau_4^2 & 2*\Delta x_4 & 2*\Delta y_4 & 2*\Delta z_4 \end{bmatrix} \begin{bmatrix} c^2 - w^2 \\ w_x \\ w_y \\ w_z \end{bmatrix} = \begin{bmatrix} r_1^2 \\ r_2^2 \\ r_3^2 \\ r_4^2 \end{bmatrix}$$

In the above matrix, each row represents a time of flight measurement from an emitter to a receiver calculated from a window of time of interest in a raw signal time series. In this matrix problem, $r_n$ is the distance between the nth emit/receive pair, and $\Delta x_n/\Delta y_n/\Delta z_n$ are the distances in x/y/z between the nth emit/receive pair, and $\tau_n$ is the time of flight between the nth emitter and receiver. The key takeaway from a practical point of view is that the measurements do not need to be made in a conventional way where two piezos alternate acting as an emitter and a receiver which slows down the measurement update rate. Instead, four unique emitter/receivers can acquire data continuously and the wind vector components and speed of sound (and thus the sonic temperature) are solved for at any point in the data acquisition time series. This opens the possibility for incredibly fast measurement update rates where the largest bandwidth limitation to a step response in atmospheric state is the piezo ringdown time which is typically around 2 ms. In a CW system, the time of flight is calculated from the phase shift measured between the emitter and receiver. Practically speaking, only a single emitter is needed, provided there are four receivers placed in positions in space where they can detect the emitted signal (i.e., not behind the emitter) and that they have sufficient diversity in spatial position to uniquely solve for the wind velocity components and speed of sound. In practice, this simplifies construction greatly, as only a single driving tone needs to be fed to an emitting piezo and the four receivers continuously record for high speed measurements.

CW Method Advantages

Figure 3:
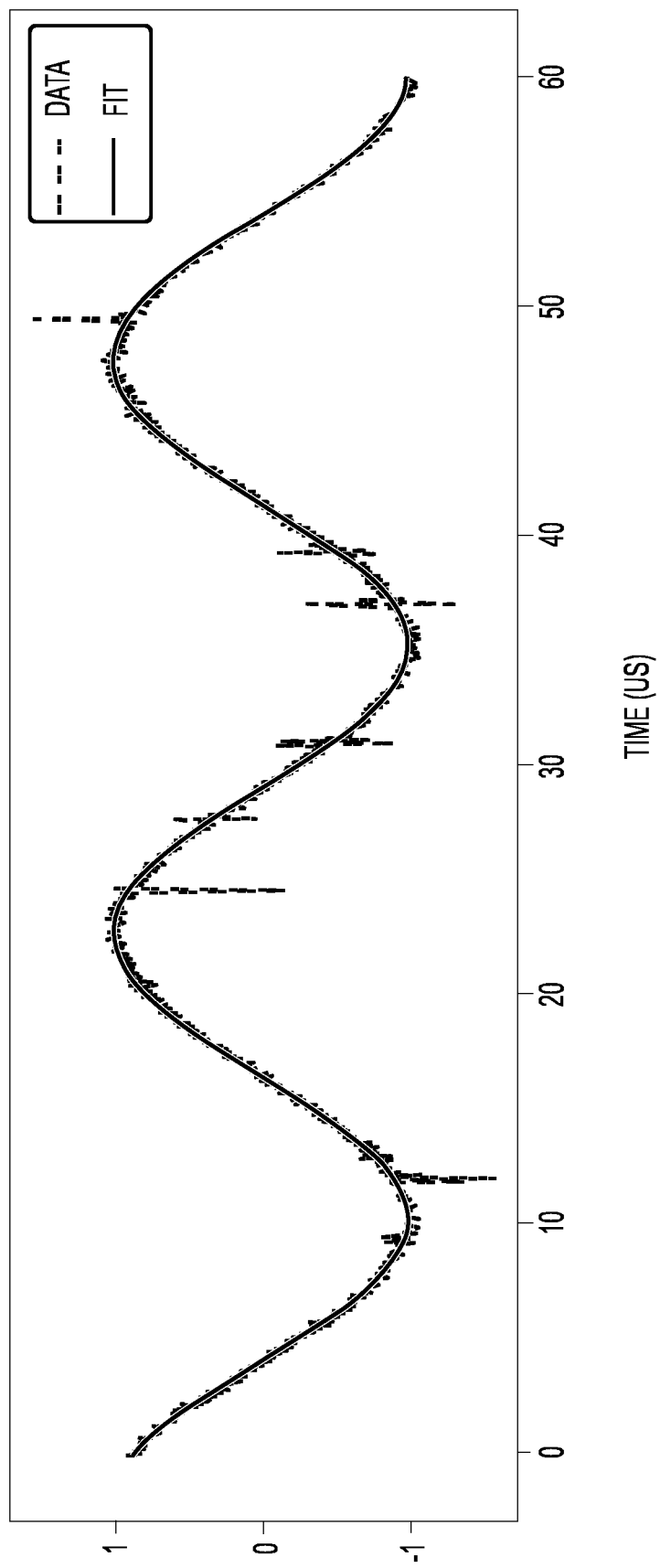
FIG. 3 shows an example of raw acoustic signals received on a piezo according to the present invention.

The preferred embodiment of the present invention uses the CW method, wherein the information lives in a narrow band of frequencies (the carrier wave frequency+/−the measurement update rate) allowing most propeller and electrical motor noise to be filtered out. FIG. 3 shows an example of a raw received acoustic signal on a piezo. The dashed line is the raw signal trace, and the solid line is the sine wave fit which filters the noise spikes in the raw data.

Figure 4:
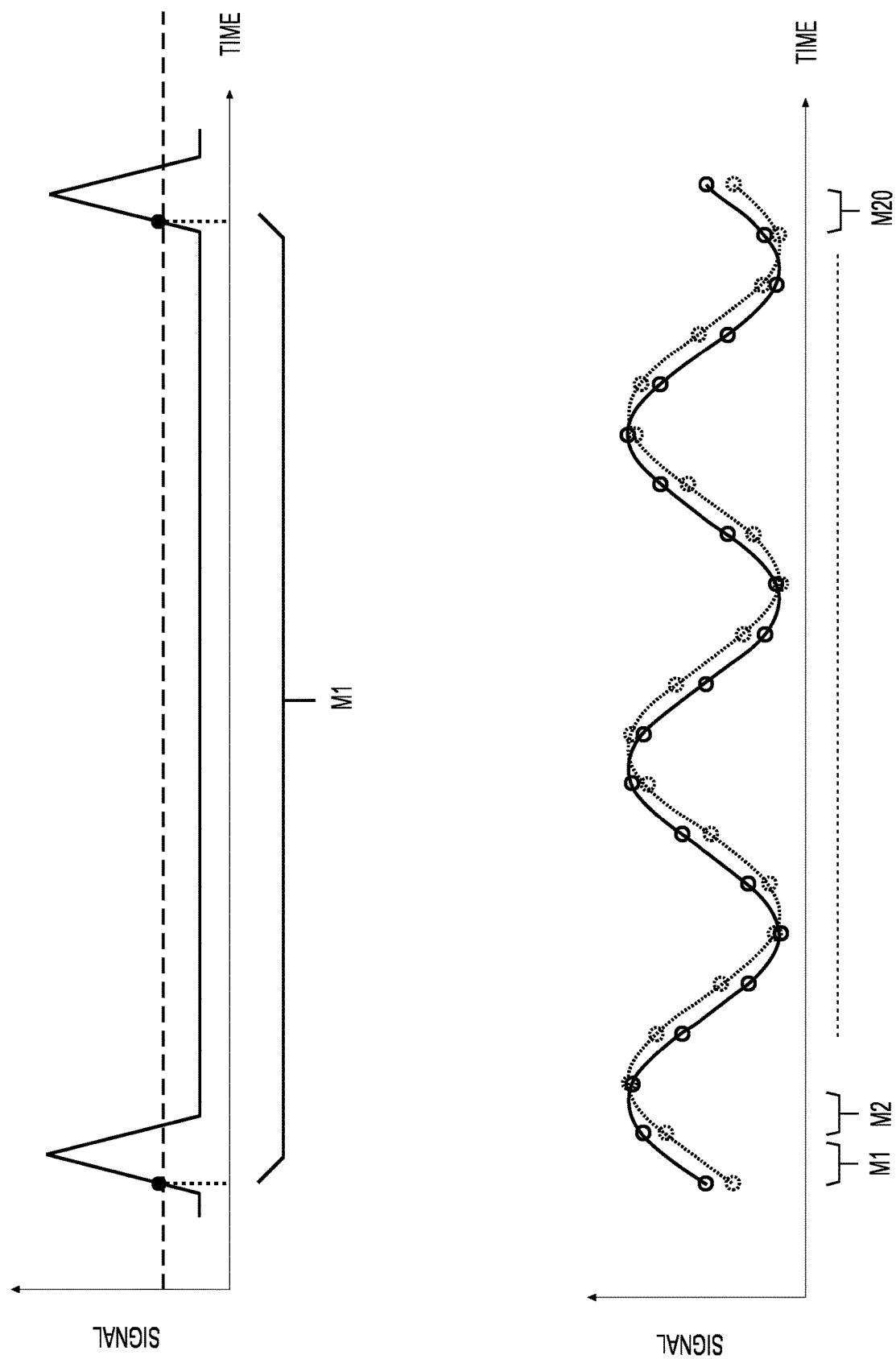
FIGS. 4(A) and 4(B) show graphs comparing TOF measurements to CW according to the present invention.

Pulsed methods by contrast require high bandwidths to capture all frequency content of a narrow pulse. Measurements with pulses and CW signals are fundamentally both time of flight (TOF) measurements, but the CW method looks for a phase shift between the emitted and received sine waves for estimating the time of flight. The advantage of making phase shift measurements is that if a received piezo signal is continuously sampled either with audio recording equipment or digital oscilloscopes, the measurement update rate can be as high as the digital sampling rate and many hundreds or thousands of measurements can be made in the same window of time as a single pulsed TOF measurement, thereby improving signal to noise ratios and opening up the possibility of resolving high speed atmospheric phenomena. FIGS. 4(A) and 4(B) compare a TOF measurement to a CW measurement, wherein FIG. 4(A) shows in a single pulsed TOF measurement period (top) where the time between the emitted pulse crossing a threshold value and the received signal crossing a threshold value.

In contrast, FIG. 4(B) shows a plurality (i.e., thousands) of CW samples being taken by high speed sampling equipment in the same time period as the single pulsed TOF measurement period. Each sample of two or more sinusoids captures a measurement of the phase shift between them, allowing many hundreds or thousands of phase measurements to be averaged together for high a signal-to-noise ratio (SNR) within the same time period a single pulsed measurement can be made.

For high speed measurements, characterizing the instrument uncertainty is a major part of the measurement, in particular for en squared applications, data that use temperature variance spectra as an input. In this regard, direct recording of the CW signals has an advantage over pulsed time of flight units in that often the time of flight is determined with an amplitude threshold circuit. Since all acoustic pulses are not perfect square waves, the slope on the leading edge of the acoustic pulse introduces an uncertainty in the time of flight as a function of acoustic pulse amplitude commonly known as 'walk error'. If unaccounted for, the walk error represents an unquantified uncertainty in a time series of anemometer data. With direct recording of CW signals, the uncertainties associated with acoustic amplitude fluctuations can be more directly quantified since the signal amplitude information is captured in the raw data.

Measurement System

For the preferred embodiment, a multichannel data acquisition system such as a digital oscilloscope with an arbitrary waveform generator could be used to form the majority of the system electronics. The arbitrary waveform generator provides the source signal that is amplified to drive the piezo emitter(s). The emitted wave and the four received signals can all be continuously sampled at >20 Msamples/sec or greater with current state of the art data acquisition systems.

Figure 5:
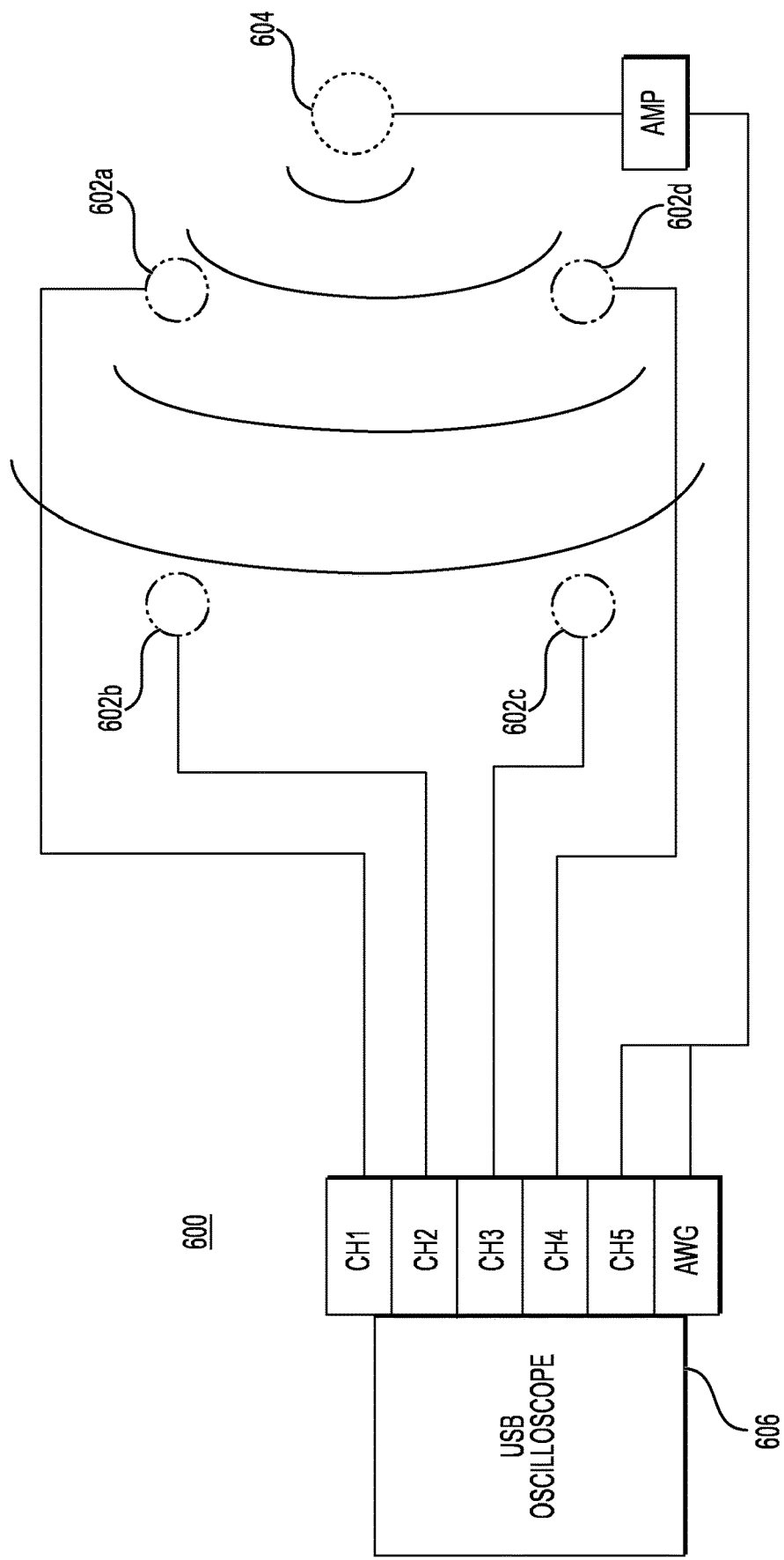
FIG. 5 illustrates a block diagram of at least one embodiment of the proposed measurement system according to the present invention.

FIG. 5 illustrates a block diagram for such a multichannel data acquisition system according to an embodiment of the present invention. In general, a sine wave from an arbitrary waveform generator is amplified to drive a piezo emitter. Four receiving piezos are driven by the acoustic wave of the emitter and their sinusoidal response is captured at high speeds by the same oscilloscope on independent channels. In at least one embodiment of the present invention, for a sonic anemometer system 500 to measure all components of a wind vector, four (4) receiver transducers 502a-502d are set up, wherein a tone is generated, amplified, and then emitted by an acoustic transducer 504 and the acoustic tone is detected by the multiple receiver transducers 502a-502d. The electrical signals from the receiving transducers are sampled by an oscilloscope 506, which effectively operates as an analog to digital (A/D) converter, in combination with the waveform originally generated for amplification and emission. No multiplexing or alternating of emitter/receiver roles makes long term high speed measurements possible.

In the preferred embodiment data reduction would start with deciding a measurement duration window period (e.g. 5 ms) where the phase shifts between the emitter and the receivers in the 5 ms window are calculated and used to solve for the wind vector and sonic temperature. The 5 ms wind can be slid over one measurement sample and the calculations are repeated. In this way, the data analyst has the freedom to choose a measurement window period for interrogating high or low speed dynamics and can look at these dynamics on a sub microsecond update rate if desired. Phase measurements can be calculated at speeds necessary for air data systems through use of a sampling period equal to an integer number of acoustic periods and Fourier's trick. Phase calculations through Fourier's trick reduces the computational burden on the data reduction electronics allowing for real time data products to be produced. High measurement update rates enable the instrument to quantify spatial and temporal variations of atmospheric temperature so an airborne platform carrying one or more (two spatially separated is useful for Cn Squared data) high speed sonic anemometers can fly through a volume of interest and measurement turbulence properties of the atmosphere.

Two concept implementations of this measurement approach from an airborne platform are shown. The first involves integrating the sensors into extensions on a quadcopter style (UAS), as shown in FIGS. 6(A)-(B). In another embodiment, this same sensor package could also be readily hung from a tethered balloon (not shown) designed for making meterological measurements. The anticipated weight of the assembly will be well within the payload capacity of current large commercially available UAS systems, and the bulk of the weight will be centered in the electronics box minimizing the impact on the moment of inertia for stable flight.

FIG. 6(A) shows one embodiment for the quadcopter implementation of an airborne platform wherein a high-speed sonic anemometers incorporates four phase locked emitters 602 emit sound at four receivers 604. FIG. 6(B) illustrates a concept sketch showing a pair of the high-speed sonic anemometers 600 being carried by a UAV 606, such as a DJI Matrice 6000. The system electronics 608 reside in a center container under the UAV, while arms 610 extend out to hold the spatially separated anemometers 606 for the quantifying turbulence structure.

Figure 7C:
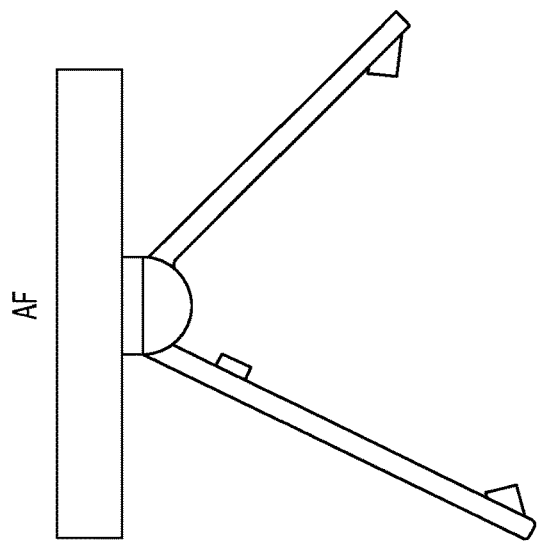
FIG. 7(C) shows a front view showing the concept mounting scheme for on the underside of the wing according to the present invention.
Figure 7B:
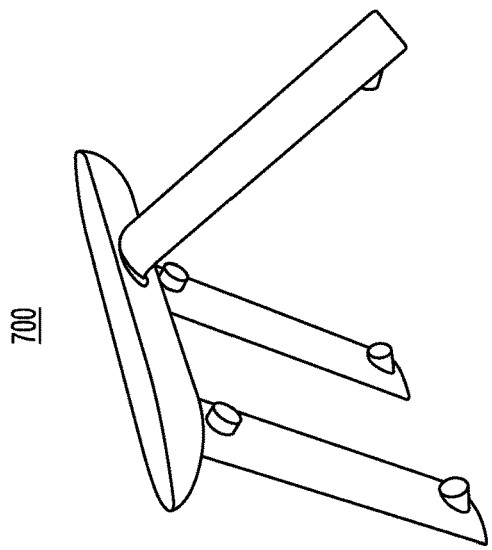
FIG. 7(B) shows an alternate view of the concept according to the present invention.
Figure 7A:
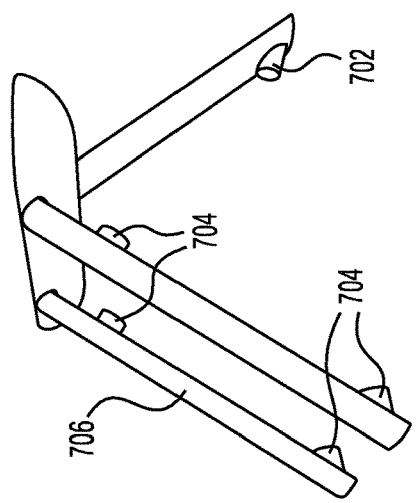
FIG. 7(A) illustrates a concept of a pod/underwing style system where a common emitter is aimed at four receivers on separate foils according to the present invention.

In another embodiment, the implementation of the airborne platform is styled as a mounted pod/wing 700 that could be attached to a UAV or larger manned airplane (see FIG. 7(A)-7(C) respectively). This packaging style is more aerodynamic and will lend itself better to fixed wing flight and the expense of angular diversity in the sampling receiver pattern.

FIG. 7(A) illustrates a concept of a pod/underwing style system 700 where a common emitter 702 is aimed at four receivers 704 on separate foils 706. FIG. 7(B) shows an alternate view, while FIG. 7(C) shows a front view showing the concept mounting scheme for a fixed wing version of the pod/underwing style system 700 on the underside of an aircraft wing AF. FIGS. 7(A)-7(C) show one embodiment of the physical locations possible for the sonic anemometer of the present invention. The piezo orientation being orthogonal to the direction of fixed wing flight protects the piezos from gathering ice that if forming would gather on the leading edge of the support surface away from the piezos. Thus arrangement protects the piezos from icing that can form on pitot probes that are oriented on the leading edge of their support structure into the direction of fixed wing flight. Heaters could be added to the transmitter and receiver to further support operation in icing conditions.

The described sensors can serve as a major sensor component in direct energy, radar wave propagation, and atmospheric science research where turbulence phenomena need to be characterized with high precision and speed. Beyond atmospheric research, the temperature and wind speed information have the ability to greatly impact the quality of pitot probe measurements on aircraft (Cooper, W. A., et al. "*Calibrating airborne measurements of airspeed, pressure and temperature using a Doppler laser air-motion sensor.*" Atmospheric Measurement Techniques 7.9 (2014): 3215-3231). Generally speaking, pitot probe measurements of air speed, temperature, and pressure uncertainties can be greatly improved by an independent measurement of true air speed and/or temperature.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims unless they depart therefrom.

I claim:

1. An airborne sonic anemometer system for measuring a volume space of interest in an atmosphere, comprising:
   an aerial vehicle; and
   an sonic anemometer system, that includes
   a processing circuit including a continuous wave output signal generator and a continuous wave received signal processor;
   one continuous wave piezo emitter operatively connected to receive a continuous wave output signal from the processing circuit and to emit the continuous wave output signal through the volume space,
   at least four continuous wave piezo receivers spatially positioned and separated from each other and from the one continuous wave piezo emitter on different geometric planes relative to the one continuous wave piezo emitter and operatively mounted to receive the continuous wave output signal emitted through the volume space from the one continuous wave piezo emitter to calculate three-dimensional wind direction and magnitude,
   a first extension foil fixedly on which the one continuous wave piezo emitter is mounted, and
   a plurality of second extension foils on which the at least four continuous wave piezo receivers are mounted, wherein
   the first extension foil and the plurality of second extension foils are fixedly mounted on the aerial vehicle and positioned to extend outwardly and away from each other relative to the aerial vehicle, and
   the plurality of second extension foils are spatially separated from each and from the first extension foil, and positioned spatially opposite the first extension foil relative to the aerial vehicle such that portions of the volume space pass through between the first extension foil having the one piezo emitter and the plurality of second extension foils having the at least four piezo receivers.

2. An airborne sonic anemometer system according to claim 1, wherein the continuous wave output is an electronic signal generator.

3. An airborne sonic anemometer system according to claim 1, wherein the received signal processor is configured to process received output signals from each of the plurality of piezo receivers through a corresponding one of a plurality of signal channels.

4. An airborne sonic anemometer system according to claim 1, further comprising:
   At least one thermometer configured to measure atmospheric temperature of a volume space between the one or more piezo emitters and one or more piezo receivers.

5. An airborne sonic anemometer system, comprising:
   an aerial vehicle;
   an sonic anemometer system, that includes
   a processing circuit including a continuous wave output signal generator and a continuous wave received signal processor;
   a plurality of piezo emitters each operatively connected to receive an output signal from the processing circuit and to emit the output signal through the volume space; and
   a plurality of piezo receivers operatively mounted to receive the output signal emitted through the volume space from a corresponding one of the plurality of piezo emitters, each of the plurality of piezo receivers being spatially separated from the corresponding one of the plurality of piezo emitters and each other;
   a plurality of extension arms fixedly mounted on and extending outward from the aerial vehicle, each of the plurality of extension arms having an inner end and an outer end, the inner end of each of the plurality of extension arms being fixedly mounted to the aerial vehicle; and
   at least four anemometer arms fixedly mounted on each of the outer ends of the plurality of extension arms, each of the at least four anemometer arms having an inner end and an outer end, wherein
   each of the at least four anemometer arms has at least one of the plurality of continuous wave piezo receivers mounted on a corresponding outer end thereof,
   the at least four anemometer arms are positioned to spatially extend away outwardly away from each other relative to the outer end of a corresponding one of the plurality of extension arms,
   each of the at least four anemometer arms has one of the plurality of piezo emitters mounted on a corresponding inner end thereof adjacent to the outer end of the corresponding one of the plurality of extension arms, and
   the plurality of continuous wave piezo receivers are positioned spatially away from plurality of piezo emitters such that portions of the volume space pass through between the at least four anemometer arms on each of the plurality of extension arms.

6. A method of enhancing an airborne air data system, the method comprising:
   providing an airborne sonic anemometer mounted on an aerial vehicle, wherein the sonic anemometer includes a processing circuit including a continuous wave output signal generator and a continuous wave received signal processor; one continuous wave piezo emitter operatively connected to receive a continuous wave output signal from the processing circuit and to emit the continuous wave output signal through the volume space, at least four continuous wave piezo receivers spatially positioned and separated from each other and from the one continuous wave piezo emitter on different geometric planes relative to the one continuous wave piezo emitter and operatively mounted to receive the continuous wave output signal emitted through the volume space from the one continuous wave piezo emitter to calculate three-dimensional wind direction and magnitude, a first extension foil fixedly on which the one continuous wave piezo emitter is mounted, and a plurality of second extension foils on which the at least four continuous wave piezo receivers are mounted, wherein the first extension foil and the plurality of second extension foils are fixedly mounted on the aerial vehicle and positioned to extend outwardly and away from each other relative to the aerial vehicle, and the plurality of second extension foils are spatially separated from each and from the first extension foil, and positioned spatially opposite the first extension foil relative to the aerial vehicle such that portions of the volume space pass through between the first extension foil having the one piezo emitter and the plurality of second extension foils having the at least four piezo receivers;

controlling the airborne sonic anemometer using at least one continuous wave processing circuit;

receiving via the at least four continuous wave piezo receivers the continuous wave travelling through an atmospheric volume space from the one continuous wave piezo emitter;

determining via the at least one continuous wave processing circuit wind speed from a difference in phase between the emitted and received signals due to the time-of-flight between the spatial separation of the one continuous wave piezo emitter and the at least four continuous wave piezo receivers; and processing the received signals so as to generate a high update rate air data measurement.

7. A method of claim 6, further comprising: providing a temperature measurement of the volume space in combination with determining the wind speed.

8. A method of claim 6, wherein measuring via the time-of-flight sonic anemometer is calculated at speeds and outputted in near-real time using a sampling period equal to an integer number of acoustic periods and Fourier's trick.

9. A method of claim 6, where measuring via the time-of-flight sonic anemometer is conducted in cooperation with other air data sensors to output high update rate air data measurements.

* * * * *